(12) United States Patent
Allore

(10) Patent No.: US 7,762,386 B2
(45) Date of Patent: Jul. 27, 2010

(54) MAGNET ASSEMBLY FOR A CONVEYOR SYSTEM

(75) Inventor: Daniel Allore, Harbor Springs, MI (US)

(73) Assignee: Industrial Magnetics Incorporated, Boyne City, MI (US)

( * ) Notice: Subject to any disclaimer, the term of this patent is extended or adjusted under 35 U.S.C. 154(b) by 873 days.

(21) Appl. No.: 11/558,643

(22) Filed: Nov. 10, 2006

(65) Prior Publication Data

US 2008/0110725 A1     May 15, 2008

(51) Int. Cl.
    *B65G 15/46*    (2006.01)
(52) U.S. Cl. ............. 198/803.6; 198/690.1; 198/472.1; 198/867.04
(58) Field of Classification Search ............. 198/472.1, 198/690.1, 803.6, 867.04
    See application file for complete search history.

(56) References Cited

U.S. PATENT DOCUMENTS

| | | | |
|---|---|---|---|
| 3,712,472 A | 1/1973 | Elliott | |
| 3,756,370 A | 9/1973 | Ingram | |
| 3,757,925 A | 9/1973 | Luther | |
| 3,871,510 A * | 3/1975 | Homeier | 198/867.13 |
| 3,937,335 A | 2/1976 | Lanham et al. | |
| 4,179,235 A | 12/1979 | Lanham et al. | |
| 4,234,281 A | 11/1980 | Lanham et al. | |
| 4,457,838 A | 7/1984 | Carr | |
| 4,586,601 A * | 5/1986 | Hodlewsky | 198/690.1 |
| 4,760,911 A * | 8/1988 | Bacigalupe et al. | 198/474.1 |
| 4,836,360 A | 6/1989 | Kasik | |
| 4,867,869 A | 9/1989 | Barrett | |
| 4,972,941 A | 11/1990 | Kasik | |
| 5,043,063 A | 8/1991 | Latimer | |
| 5,056,654 A | 10/1991 | Kasik | |
| 5,147,033 A | 9/1992 | Kasik | |
| 5,188,216 A | 2/1993 | Smith et al. | |
| 5,579,897 A | 12/1996 | Kasik | |
| 5,649,619 A | 7/1997 | Kasik | |
| 5,817,361 A | 10/1998 | Campbell et al. | |
| 5,871,084 A | 2/1999 | Kasik | |
| 5,982,261 A | 11/1999 | Stowe | |
| 6,502,687 B1 * | 1/2003 | Ayen et al. | 198/370.04 |
| 6,957,734 B2 * | 10/2005 | Imai et al. | 198/472.1 |
| 7,114,614 B2 * | 10/2006 | Hamilton et al. | 198/803.6 |
| 7,121,400 B2 * | 10/2006 | Fandella | 198/619 |
| 7,281,710 B2 * | 10/2007 | Okazaki et al. | 271/193 |
| 2004/0256201 A1 | 12/2004 | Hamilton et al. | |
| 2005/0280488 A1 | 12/2005 | Devine | |

* cited by examiner

*Primary Examiner*—Douglas A Hess
(74) *Attorney, Agent, or Firm*—Howard & Howard Attorneys PLLC

(57) ABSTRACT

A magnet assembly for a conveyor system transporting a ferromagnetic container includes a housing having a unitary configuration. The housing defines a pocket, and a magnetic circuit is disposed in the pocket. The magnetic circuit produces a magnetic field having a magnetic flux. The magnetic circuit attracts the ferromagnetic container being transported by the conveyor system. In addition, a method of forming the magnet assembly to radiate the magnetic field includes providing the unitary housing having an opening and inserting the magnetic circuit into the unitary housing. The method further includes encapsulating the magnetic circuit in the unitary housing to form the magnet assembly.

19 Claims, 3 Drawing Sheets

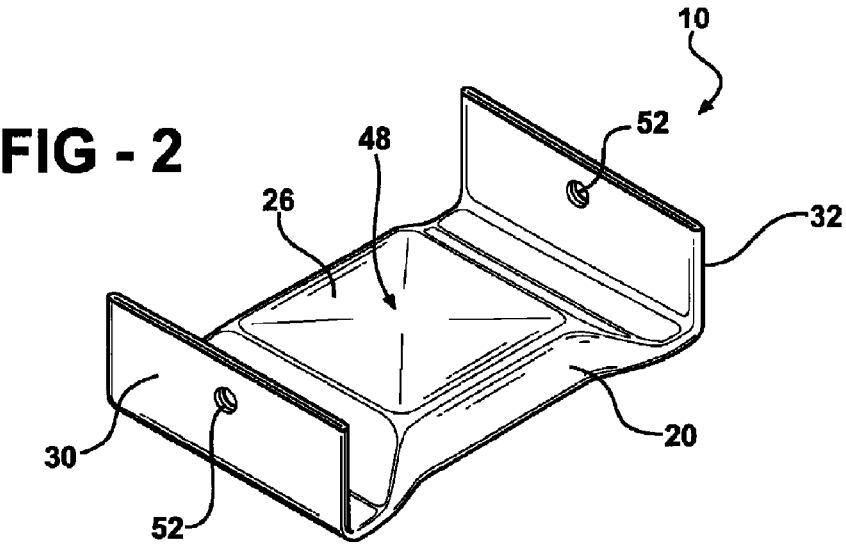
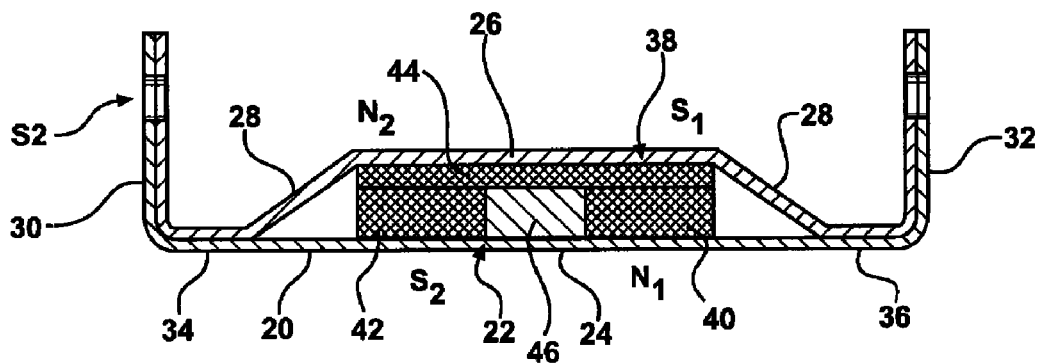
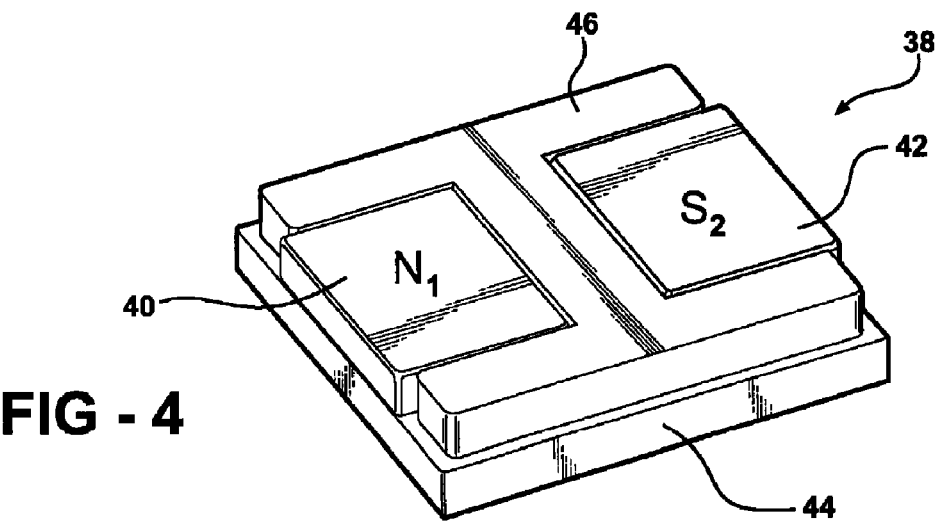

MAGNET ASSEMBLY FOR A CONVEYOR SYSTEM

BACKGROUND OF THE INVENTION

1. Field of the Invention

The present invention generally relates to a magnet assembly for a conveyor system and a method of forming the magnet assembly.

2. Description of the Related Art

Various magnet assemblies used with conveyor systems are known in the art. Conveyor systems typically include a drive assembly and a grid disposed on the drive assembly. Generally, the grid includes at least one laterally extending support, such as a rail, and the magnet assembly rests upon the rail. The magnet assembly includes a magnetic circuit that generates a magnetic field having a magnetic flux along a contact surface of the magnet assembly. When transporting a ferromagnetic container with the conveyor system, the ferromagnetic container is supported by the grid and the magnet assembly holds the ferromagnetic container onto the grid.

This type of conveyor system may be used by various industries, and specifically, the magnet assembly is useful when transporting the ferromagnetic container through a baking apparatus, such as a proofer or an oven. When used with a baking apparatus, dough is placed in the ferromagnetic container, and the conveyor system transports the dough through a proofer to proof the dough and an oven to cook the dough. One such conveyor system is shown in U.S. Pat. No. 5,188,216 to Smith et al. (the '216 patent). The conveyor system of the '216 patent includes a pair of magnets surrounded by a two-piece housing. The magnets hold the ferromagnetic container to the grid while the conveyor system transports the ferromagnetic container through the baking apparatus. Regardless of the industry, it is beneficial to hold the ferromagnetic container onto the conveyor system while being transported.

Although the conveyor systems of the prior art may be used to transport the ferromagnetic container through the conveyor system, the magnet assemblies of the prior art have several disadvantages. First, the two-piece housing design does not completely seal off the magnets from debris in the environment outside the housing, which allows various particles to get inside the housing. For instance, oil from the drive assembly of the conveyor system can get into the housing and affect a magnetic flux of the magnets. When used with a baking apparatus, flour from the dough and other particles in the air may also get into the housing and reduce the magnetic flux. Next, in the magnet assemblies of the prior art, the magnetic flux is uniform around the magnet assembly. Since the ferromagnetic container only attaches to one surface of the magnet assembly, a portion of the magnetic field is wasted.

Therefore, a magnet assembly is needed that prevents debris in the environment outside the housing from interfering with the magnetic flux of the magnets inside the magnet assembly. Likewise, a method of forming a magnet assembly that prevents debris from entering the magnet assembly is needed. In addition, a magnet assembly is needed that redistributes the magnetic flux to increase the magnetic flux along one surface of the housing while decreasing the magnetic flux along another surface of the housing.

SUMMARY OF THE INVENTION AND ADVANTAGES

The subject invention provides a magnet assembly for a conveyor system transporting a ferromagnetic container. The magnet assembly has a housing having a unitary configuration. The housing defines a pocket. A magnetic circuit disposed in the pocket. The magnetic circuit produces a magnetic field having a magnetic flux. The magnetic field attracts the ferromagnetic container being transported by the conveyor system. The subject invention also provides a method of forming the magnet assembly to radiate the magnetic field. The method includes the steps of providing the unitary housing. The unitary housing has an opening, and the method includes inserting the magnetic circuit into the opening of the unitary housing. The method further includes encapsulating the magnetic circuit in the unitary housing.

Encapsulating the magnetic circuit in the unitary housing prevents debris from the environment around the magnet assembly from interfering with the magnetic flux of the magnet assembly. Specifically, the unitary housing keeps the debris from attaching to the magnetic circuit and reducing the magnetic flux, thus improving the life of the magnet assembly, as well as allowing for use in applications where two-piece magnet assemblies previously could not be used. In addition, by forming the magnet assembly from the unitary housing is more simplistic than methods of the prior art, resulting in decreased production time and increased output. In addition, forming the magnet assembly from the unitary housing results in a more rigid design.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a perspective view of the magnet assembly used with the conveyor system of FIG. 1;

FIG. 3 is a cross-sectional side view of the magnet assembly of FIG. 2;

FIG. 4 is a perspective view of a magnetic circuit used with the magnet assembly of FIG. 2;

DETAILED DESCRIPTION OF THE INVENTION

Figure 1:
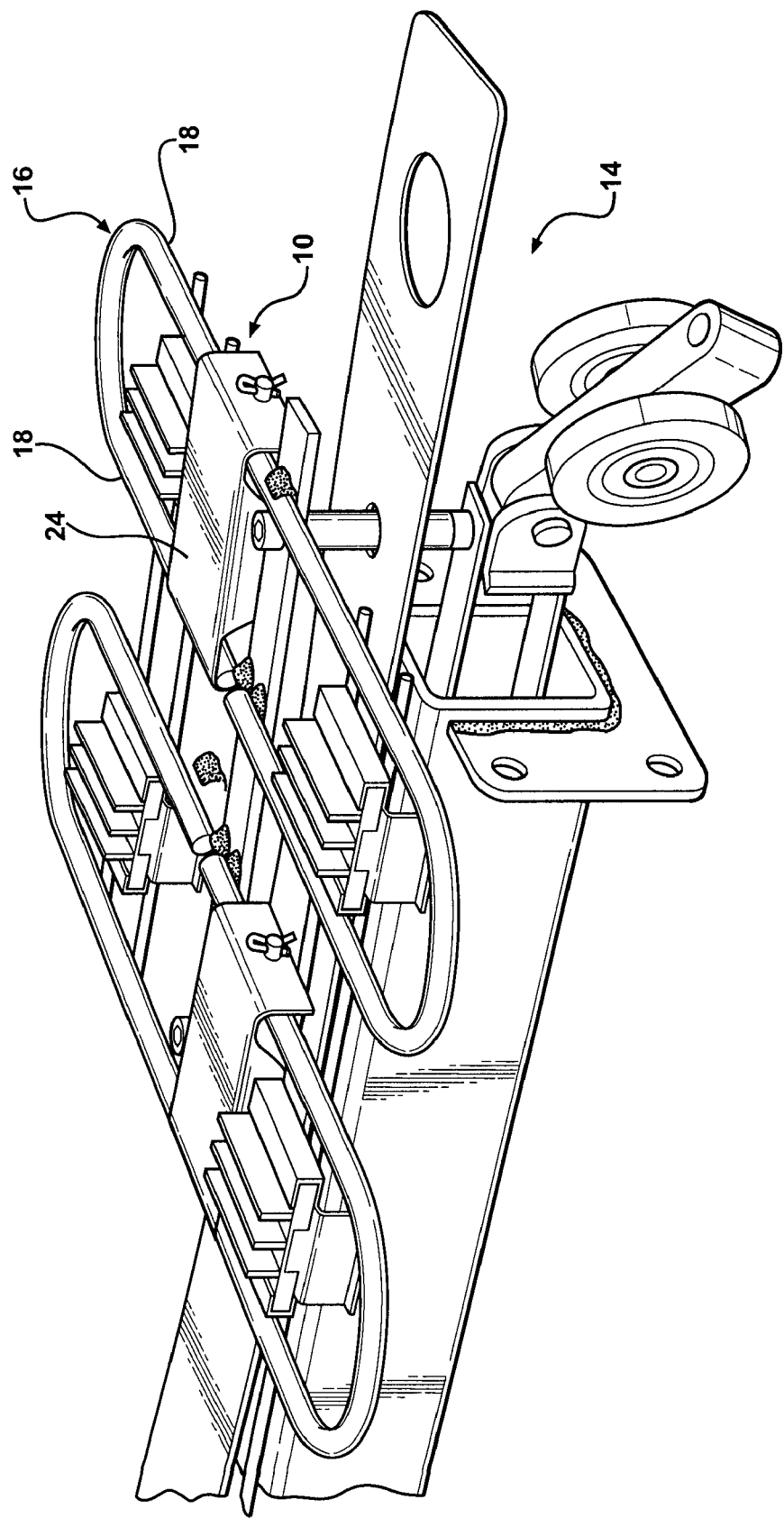
FIG. 1 is a perspective view of a conveyor system utilizing a magnet assembly.

Referring to the Figures, wherein like numerals indicate corresponding parts throughout the several views, a magnet assembly is shown generally at reference numeral 10. The magnet assembly 10 as shown herein may be used with a conveyor system 12. The conveyor system 12 may be used for transporting a ferromagnetic container (not shown), such as a pan through a baking apparatus or any other device. The ferromagnetic container may be made of any material that is affected by a magnetic field. When used with the baking industry, the pan holds dough and the conveyor transports the pan through a proofer to make the dough rise. Next, the conveyor system 12 transports the pan through an oven to cook the dough. Therefore, the magnetic attraction of the ferromagnetic container to the magnetic field must be able to withstand temperatures typically used in a baking apparatus.

Even though the conveyor system 12 is described for use with a baking apparatus, it is to be understood that the conveyor system 12 of the present invention may be used with any type of apparatus that transports the ferromagnetic container, such as a baking apparatus. Referring now to FIG. 1, generally, the conveyor system 12 has a drive assembly 14. The drive assembly 14 typically includes a drive chain and motor for moving the drive chain. A grid 16 is disposed on the drive assembly 14 and has at least one rail 18 for supporting the ferromagnetic container on the drive assembly 14. Preferably, the grid 16 includes multiple sets of two rails 18 spaced from one another. More preferably, the rails 18 are laterally spaced and parallel to one another. The rails 18 are mounted to the drive assembly 14 and as the drive chain moves, the rail 18 moves with it. Even though rails 18 are described as the preferred embodiment, it is within the scope of the subject invention that the grid 16 may alternatively include a platform for supporting the magnet assembly 10. In addition, it is within the scope of the subject invention that the platform need not have a planar surface and may be formed to mate with the magnet assembly 10. For example, the platform may define slots for securing the magnet assembly 10 onto the grid 16, or the platform may define a cavity and the magnet assembly 10 rests in the cavity. The magnet assembly 10 as described herein is disposed on the grid 16 such that the magnet assembly 10 moves with the rails 18.

Figure 5A:
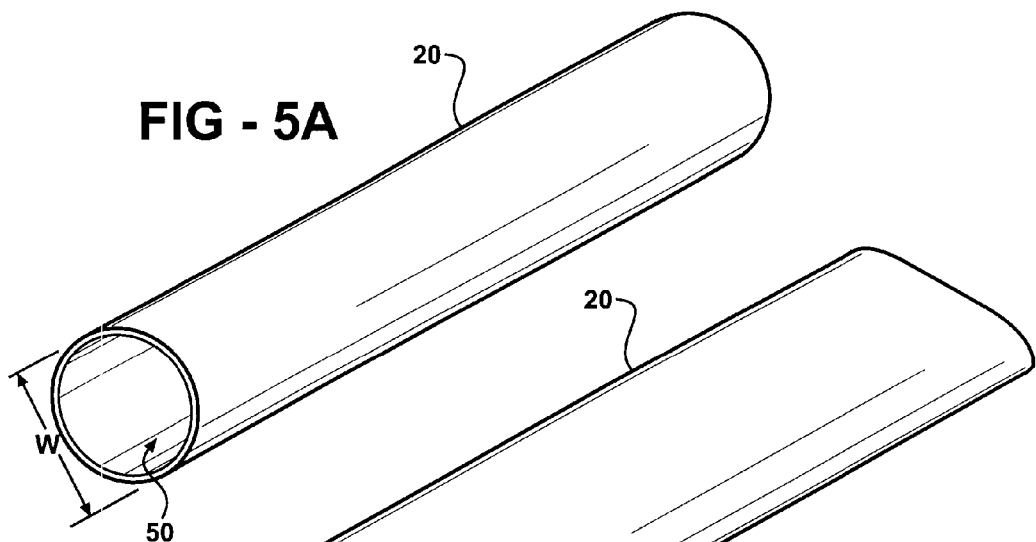
FIG. 5A is a perspective view of a one-piece tube forming a unitary housing used with the magnet assembly of FIG. 2.

The magnet assembly 10 radiates a magnetic field having a magnetic flux. Magnetic flux is defined as a measure of strength of the magnetic field. As known to those skilled in the art, the magnetic flux is great enough to attract the ferromagnetic container and hold the ferromagnetic container onto the rails 18. As best shown in FIGS. 2 and 3, the magnet assembly 10 has a housing 20 having a unitary configuration. Preferably, as discussed in greater detail below, the housing 20 is formed from a one-piece tube to establish the unitary configuration of the housing 20. In addition, the unitary housing 20 is formed from a non-magnetic material, such as 300 series stainless steel. However, those skilled in the art realize that the unitary housing 20 may be formed from other non-magnetic materials. As shown in FIG. 5A, the one-piece tube forming the unitary housing 20 has a circular cross-section before the magnetic circuit 38 is disposed in the one-piece tube. However, those skilled in the art realize that the one-piece tube may have different configurations other than a circular cross-section before the magnetic circuit 38 is placed into the one-piece tube. For instance, the one-piece tube may have an elliptical or oval cross-section. Alternatively, the one-piece tube may have a rectangular, and specifically, a square cross-section. In other words, the one-piece tube may be defined as a longitudinally extending hollow piece having any cross-sectional configuration.

Referring back to FIGS. 2 and 3, once the one-piece tube is formed into the unitary housing 20, the housing 20 defines a pocket 22. Specifically, the unitary housing 20 includes a container support portion 24 for supporting the ferromagnetic container and a magnet support portion 26 spaced from the container support portion 24 to define the pocket 22 therebetween. Preferably, both the container support portion 24 and the magnet support portion 26 define lengths. The length of the container support portion 24 is greater than the length of the magnet support portion 26 so that the support portion 26 may support the ferromagnetic container and the magnet support portion 26 may be disposed between the rails 18. Here, container support portion 24 rests on the rails 18 to support the magnet assembly 10 on the grid 16. Alternatively, the length of the container support portion 24 may be equal to the length of the magnet support portion 26. In this alternative, the magnet support portion 26 is in contact with the rails 18 to support the magnet assembly 10 on the grid 16. In yet another alternative, the length of the container support portion 24 may be shorter than the length of the magnet support portion 26. As in the previous alternative, the magnet support portion 26 is in contact with the rails 18 to support the magnet assembly 10 on the grid 16.

Both the container support portion 24 and the magnet support portion 26 are integrally formed with the unitary housing 20. In one embodiment, the magnet support portion 26 may extend directly from the container support portion 24. Alternatively, in a preferred embodiment, as best shown in FIGS. 2 and 3, the unitary housing 20 includes at least one interconnecting wall 28 integrally formed with and extending between the container support portion 24 and the magnet support portion 26. Preferably, the unitary housing 20 includes two interconnecting walls 28 integrally formed with and extending between the container support portion 24 and the magnet support portion 26. In this embodiment, the interconnecting walls 28 further define the pocket 22 with the container support portion 24 and the magnet support portion 26. The interconnecting walls 28 may be perpendicular to the container support portion 24 and the magnet support portion 26, or preferably, extend at an angle between the container support portion 24 and the magnet support portion 26.

The angle of the interconnecting walls 28 relative to the container support portion 24 and the magnet support portion 26 may depend upon the lengths of the container support portion 24 and the magnet support portion 26. As described above, the container support portion 24 may have a length greater than the magnet support portion 26, the container support portion 24 may have a length shorter than the magnet support portion 26, or the container support portion 24 and the magnet support portion 26 may have equal lengths. If the length of the container support portion 24 is greater than the length of the magnet support portion 26, or if the length of the container support portion 24 is shorter than the length of the magnet support portion 26, then, preferably, the interconnecting walls 28 extend from the container support portion 24 at an angle other than 90 degrees. Likewise, if the lengths between the container support portion 24 and the magnet support portion 26 are equal, then the interconnecting wall 28 may be perpendicular to both the container support portion 24 and the magnet support portion 26. On the other hand, those skilled in the art realize that the interconnecting wall 28 may extend between the container support portion 24 and the magnet support portion 26 at any angle independent of the lengths of the container support portion 24 and the magnet support portion 26.

The unitary housing 20 further includes first and second tabs 30, 32 integrally formed from the container support portion 24 and/or the magnet support portion 26. As shown in the figures, the first and second tabs 30, 32 have planar surfaces that hold the unitary housing 20 laterally in place on the conveyor system 12. Although shown as having planar surfaces, those skilled in the art realize that the first and second tabs 30, 32 may alternatively have curved surfaces or any other non-planar surface. For instance, the first and second tabs 30, 32 may wrap around the rails 18 to hold the magnet assembly 10 onto the grid 16. Regardless of their configuration, the first and second tabs 30, 32 extend from the container support portion 24 to limit lateral movement of the unitary housing 20 on the conveyor system 12.

Preferably, the first and second tabs 30, 32 extend from the container support portion 24 beyond the magnet support portion 26 such that the magnet support portion 26 is spaced from the rails 18 of the conveyor system 12. In other words, the container support portion 24 has a length greater than the magnet support portion 26 and the first and second tabs 30, 32 extend from first and second planar segments 36, respectively, of the container support portion 24. In this embodiment, the magnet assembly 10 is supported on the rails 18 by the first and second planar segments 34, 36, and the first and second tabs 30, 32 limit lateral movement of the unitary housing 20 on the conveyor system 12. As best shown in FIGS. 2 and 3, the first and second tabs 30, 32 may extend perpendicularly from the container support portion 24 although those skilled in the art realize that the first and second tabs 30, 32 may extend from the container support portion 24 at any angle. In addition, the first and second tabs 30, 32 may extend from the container support portion 24 parallel to one another, although those skilled in the art realize that the first and second tabs 30, 32 need not extend from the container support portion 24 parallel to one another.

To stay mounted onto the conveyor, the first and second tabs 30, 32 may include at least one hole 52 each. A fastener may be disposed in the hole 52 to hold the magnet assembly 10 onto the grid 16. The fastener may have a long cylindrical configuration and extend into both holes 52 and include a cotter pin for locking the fastener in place. Those skilled in the art realize that the magnet assembly 10 may be held onto the conveyor in other ways.

Referring now to FIGS. 3 and 4, the magnet assembly 10 further includes a magnetic circuit 38 disposed in the pocket 22 for producing the magnetic field. As previously discussed, the magnetic field attracts the ferromagnetic container and the strength of the magnetic field is defined as the magnetic flux. The greater the magnetic flux, the stronger the attraction between the magnet assembly 10 and the ferromagnetic container. The magnetic circuit 38 includes a first magnet 40 disposed in the pocket 22 and a second magnet 42 disposed in the pocket 22 spaced from the first magnet 40 for producing the magnetic field. As known in the art, magnets are affected by temperature. Therefore, the first and second magnets 40, 42 must radiate the magnetic field despite the temperature of the environment surrounding the magnet assembly 10. For instance, when used with the baking apparatus, the first and second magnets 40, 42 must be able to radiate the magnetic field despite being in an environment with temperatures associated with a proofer and an oven. Accordingly, those skilled in the art realize that the first and second magnets 40, 42 must be able to radiate the magnetic field in temperatures common to whatever type of apparatus the magnet assembly 10 is used with.

Preferably, the first magnet 40 and the second magnet 42 are disposed in the pocket 22 adjacent to the container support portion 24. However, those skilled in the art realize that the first and second magnets 40, 42 may be spaced from the container support portion 24. The magnetic field flows between the first magnet 40 and the second magnet 42. The first magnet 40 has a first polarity and the second magnet 42 has a second polarity opposite the first polarity such that the magnetic field flows between the first magnet 40 and the second magnet 42. Specifically, the first magnet 40 has a north surface $N_1$ and a south surface $S_1$ opposite the north surface $N_1$. Preferably, the north surface $N_1$ faces the container support portion 24 and the south surface $S_1$ faces the magnet support portion 26. The south surface $S_1$ is spaced from the magnet support portion 26. Similarly, the second magnet 42 has a north surface $N_2$ and a south surface $S_2$. However, with the second magnet 42, the south surface $S_2$ faces the container support portion 24 and the north surface $N_2$ faces the magnet support portion 26. The north surface $N_2$ of the second magnet 42 is spaced from the magnet support portion 26. Those skilled in the art appreciate that the first magnet 40 may have the south surface $S_1$ facing the container support portion 24 and the second magnet 42 having the north surface $N_2$ facing the container support portion 24. Specifically, the first and second magnets 40, 42 may be oriented in the magnet assembly 10 any way that allows the magnetic field to flow between the first magnet 40 and the second magnet 42. In addition, it is preferred that the first and second magnets 40, 42 have uniform magnetic fields so the flow of the magnetic field between the first and second magnets 40, 42 is also uniform. However, as will be discussed in greater detail below, the magnetic flux of the magnetic circuit 38 need not be uniform along the container support portion 24 and the magnet support portion 26.

To provide various magnetic fields, the first and second magnets 40, 42 may have various shapes when viewed in cross-section. As best shown in FIG. 3, the first and second magnets 40, 42 have rectangular cross-sections. Alternatively, the magnets may have other cross-sectional shapes such as a square cross-section or a circular cross-section. Preferably, the first magnet 40 and the second magnet 42 have similar cross-sections to one another so that the magnetic field between the first and second magnets 40, 42 is uniform.

Since the magnetic field is uniform about the magnetic circuit 38, the magnetic flux along the container support portion 24 is generally equal to the magnetic flux along the magnet support portion 26. However, the ferromagnetic container is only supported by the container support portion 24. It is beneficial to increase the magnetic flux along the container support portion 24 and reduce the magnetic flux along the magnet support portion 26. Therefore, in addition to the first and second magnets 40, 42, referring back to FIGS. 3 and 4, the magnetic circuit 38 includes a ferromagnetic plate 44 magnetically connected to the first magnet 40 and the second magnet 42 and adjacent to the magnet support portion 26 for increasing the magnetic flux along the container support portion 24 and decreasing the magnetic flux along the magnet support portion 26 such that the container support portion 24 attracts the ferromagnetic container while being transported by the conveyor system 12. In other words, the ferromagnetic plate 44 redistributes the magnetic flux to increase the magnetic field along the container support portion 24. By strengthening the magnetic field along the container support portion 24, the magnet assembly 10 is better able to attract the ferromagnetic container to the conveyor system 12. Generally, the ferromagnetic plate 44 is formed from 400 series stainless steel, although those skilled in the art realize that forming the ferromagnetic plate 44 from other materials is within the scope of the subject invention.

Next, it is preferred that the first and second magnets 40, 42 are laterally spaced from one another. Therefore, the magnet assembly 10 further includes a spacer 46 disposed in the pocket 22 of the unitary housing 20 on the ferromagnetic plate 44 for separating the first magnet 40 from the second magnet 42 and for preventing the first and second magnets 40, 42 from moving around inside the pocket 22. The spacer 46 allows the magnetic field to flow between the first and second magnets 40, 42 along the length of the container support portion 24. The spacer 46 may have various configurations from a top or perspective view. Referring to FIG. 4, the spacer 46 is preferably H-shaped and each leg has a rectangular configuration. Alternatively, the spacer 46 may extend have other configurations that adequately separate the first and second magnets 40, 42 inside the unitary housing 20 and prevent the first and second magnets 40, 42 from moving around inside the pocket 22. Generally, the spacer 46 is formed from aluminum, although those skilled in the art realize that the space may be formed from other materials within the scope of the subject invention.

Referring back to FIG. 2, while moving on the conveyor system 12, the magnet assembly 10 may rattle. Specifically, the magnetic circuit 38 disposed inside the pocket 22 of the magnet assembly 10 may rattle inside the pocket 22. In order to reduce rattle, the magnet support portion 26 defines a dimple 48. As shown, the dimple 48 is centrally located on a surface of the magnet support portion 26. However, those skilled in the art realized that the dimple 48 may be spaced from the center of the magnet support portion 26.

The subject invention further includes a method of forming the magnet assembly 10 to radiate the magnetic field. FIGS. 5A-D show the result of various steps in the method described herein. The method includes providing the unitary housing 20 having an opening 50. The opening 50 defines a width "w" and the magnetic circuit 38 fits into the opening 50. Preferably, as previously discussed, the unitary housing 20 is formed from the one-piece tube having the opening 50 as shown in FIG. 5A. In this preferred embodiment, providing the unitary housing 20 may be further defined as providing the one-piece tube.

Figure 5B:
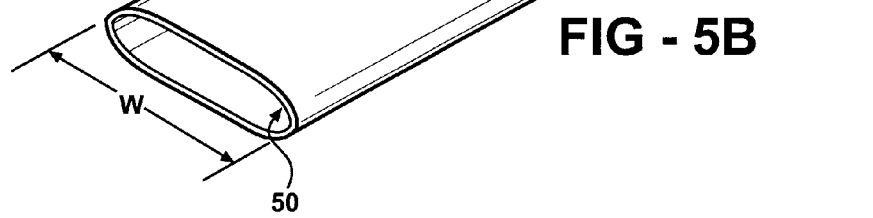
FIG. 5B is a perspective view of the one-piece tube of FIG. 5A partially compressed.

Next, the method includes inserting the magnetic circuit 38 into the opening 50 of the unitary housing 20. In the preferred embodiment where the unitary housing 20 is the one-piece tube, the method may further include partially compressing the one-piece tube to widen the opening 50 prior to inserting the magnetic circuit 38. In other words, the one-piece tube is partially flattened so that the opening 50 is wide enough to receive the magnetic circuit 38. FIG. 5B shows the one-piece tube partially compressed to receive the magnetic circuit 38.

Figure 5C:
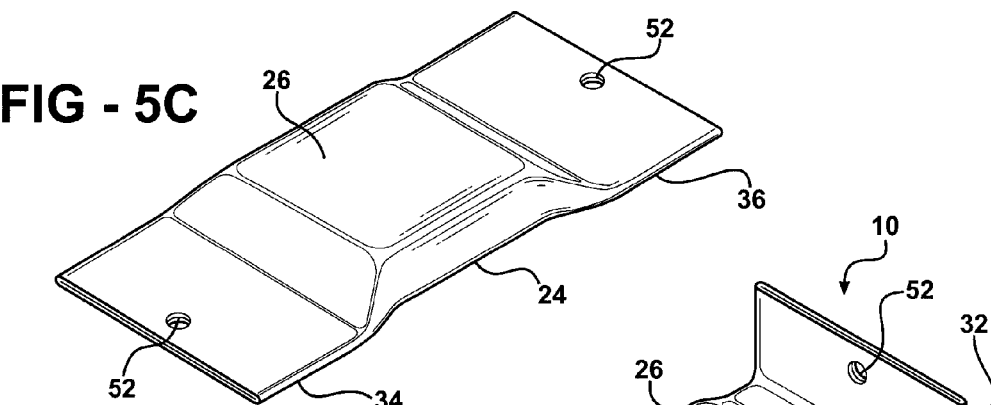
FIG. 5C is a perspective view of the one-piece tube of FIG. 5B stamped about the magnetic circuit to define first and second planar segments.

Further, the method includes encapsulating the magnetic circuit 38 in the unitary housing 20 to form the magnet assembly 10. Referring now to FIG. 5C, encapsulating the magnetic circuit 38 in the unitary housing 20 may be further defined as stamping the unitary housing 20 about the magnetic circuit 38 to distinguish the container support portion 24 having the first and second planar segment 36 from the magnet support portion 26 spaced from the container support portion 24. Preferably, the method also includes centering the magnetic circuit 38 within the unitary housing 20 before encapsulating the magnetic circuit 38 in the unitary housing 20. This way, the first and second planar segments 34, 36 are equal in size.

Figure 5D:
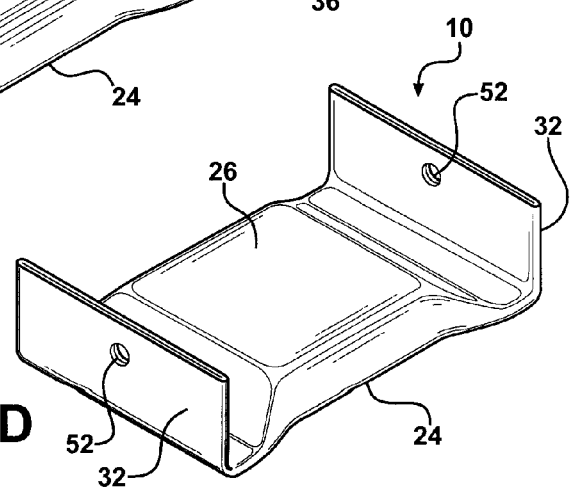
FIG. 5D is a perspective view of the unitary housing after bending the first and second planar segments to form first and second tabs, respectively.

Once the first and second planar segments 34, 36 are formed, referring to FIG. 5D, the method includes bending the first planar segment 34 of the container support portion 24 toward the magnet support portion 26 to define the first tab 30 and the second planar segment 36 of the container support portion 24 toward the magnet support portion 26 to define the second tab 32. Preferably, the steps of bending the first planar segment 34 and the second planar segment 36 to define the first and second tabs 30, 32, respectively, are simultaneous. In other words, in the preferred embodiment, the first tab 30 is formed simultaneously with the second tab 32.

Encapsulating the magnetic circuit 38 in the unitary housing 20 prevents debris from the environment around the magnet assembly 10 from interfering with the magnetic flux of the magnet assembly 10. Specifically, the unitary housing 20 keeps debris from attaching to the magnetic circuit 38 and reducing the magnetic flux, thus improving the life of the magnet assembly 10, as well as allowing for use in applications where two-piece magnet assemblies previously could not be used.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A magnet assembly for a conveyor system transporting a ferromagnetic container, said magnet assembly comprising:
   a housing having a unitary configuration and defining a pocket, said unitary housing including a container support portion for supporting the ferromagnetic container and a magnet support portion spaced from said container support portion to define said pocket therebetween; and
   a magnetic circuit disposed in said pocket of said unitary housing between said container support portion and said magnetic support portion for producing a magnetic field having a magnetic flux for attracting the ferromagnetic container being transported by the conveyor system.

2. A magnet assembly as set forth in claim 1 wherein said container support portion has a length and said magnet support portion has a length and said length of said container support portion is greater than said length of said magnet support portion.

3. A magnet assembly as set forth in claim 1 wherein said unitary housing includes at least one interconnecting wall integrally formed with and extending between said container support portion and said magnet support portion.

4. A magnet assembly as set forth in claim 1 wherein said unitary housing further includes first and second tabs integrally formed with said unitary housing and extending from said container support portion beyond said magnet support portion such that said magnet support portion is spaced from the conveyor system.

5. A magnet assembly as set forth in claim 1 wherein said magnetic circuit includes a first magnet disposed in said pocket and a second magnet disposed in said pocket spaced from said first magnet for producing the magnetic field.

6. A magnet assembly as set forth in claim 5 wherein said magnetic circuit includes a ferromagnetic plate magnetically connected to said first magnet and said second magnet and adjacent to said magnet support portion for increasing the magnetic flux along said container support portion and decreasing the magnetic flux along said magnet support portion such that the container support portion attracts the ferromagnetic container while being transported by the conveyor system.

7. A magnet assembly as set forth in claim 5 further including a spacer disposed in said pocket of said unitary housing on said ferromagnetic plate for separating said first magnet from said second magnet.

8. A magnet assembly as set forth in claim 1 wherein said magnet support portion defines a dimple for reducing rattle.

9. A magnet assembly as set forth in claim 1 wherein said housing is formed from a one-piece tube to establish said unitary configuration of said housing.

10. A magnet assembly as set forth in claim 1 wherein said unitary housing is formed from a non-magnetic material.

11. A conveyor system for transporting a ferromagnetic container, said conveyor system comprising:
    a drive assembly;
    a grid disposed on said drive assembly and having at least one rail for supporting the ferromagnetic container on the drive assembly;
    a housing having a unitary configuration and disposed on said grid, said unitary housing defining a pocket and including a container support portion for supporting the ferromagnetic container and a magnet support portion spaced from said container support portion to define said pocket therebetween; and a magnetic circuit disposed in said pocket of said unitary housing between said container support portion and said magnet support portion for producing a magnetic field having a magnetic flux to attract the ferromagnetic container and hold the ferromagnetic container onto said at least one rail.

12. A conveyor system as set forth in claim 11 wherein said unitary housing includes at least one interconnecting wall integrally formed with and extending between said container support portion and said magnet support portion.

13. A conveyor system as set forth in claim 11 further including first and second tabs integrally formed with said unitary housing and extending from said container support portion beyond said magnet support portion such that said magnet support portion is spaced from the grid.

14. A conveyor system as set forth in claim 11 wherein said magnetic circuit includes a first magnet disposed in said pocket and a second magnet disposed in said pocket spaced from said first magnet for producing the magnetic field.

15. A conveyor system as set forth in claim 14 wherein said magnetic circuit includes a ferromagnetic plate magnetically connected to said first magnet and said second magnet and adjacent to said magnet support portion for increasing the magnetic flux along said container support portion and decreasing the magnetic flux along said magnet support portion such that the container support portion attracts the ferromagnetic container being transported on said grid by said drive assembly.

16. A conveyor system as set forth in claim 14 further including a spacer disposed in said pocket of said unitary housing on said ferromagnetic plate for separating said first magnet from said second magnet.

17. A conveyor system as set forth in claim 11 wherein said magnet support portion defines a dimple for reducing rattle.

18. A conveyor system as set forth in claim 11 wherein said housing is formed from a one-piece tube to establish said unitary configuration of said housing.

19. A conveyor system as set forth in claim 11 wherein said unitary housing is formed from a non-magnetic material.

* * * * *